United States Patent
Maybee

(10) Patent No.: US 7,022,270 B2
(45) Date of Patent: Apr. 4, 2006

(54) METHOD OF MANUFACTURING COMPOSITE UTILITY POLES

(75) Inventor: George K. Maybee, Henderson, CO (US)

(73) Assignee: W. J. Whatley, Inc., Commerce City, CO (US)

( * ) Notice: Subject to any disclaimer, the term of this patent is extended or adjusted under 35 U.S.C. 154(b) by 0 days.

(21) Appl. No.: 10/229,753

(22) Filed: Aug. 28, 2002

(65) Prior Publication Data

US 2003/0219561 A1    Nov. 27, 2003

Related U.S. Application Data

(60) Provisional application No. 60/382,384, filed on May 22, 2002.

(51) Int. Cl.
*B29C 45/14* (2006.01)
*B29C 70/88* (2006.01)

(52) U.S. Cl. .................. 264/35; 264/259; 264/271.1; 264/275

(58) Field of Classification Search .............. 264/31, 264/35, 36.16, 36.2, 259, 267, 271.1, 261, 264/275, 279, 279.1; 52/514, 745.17, 742.14; 156/94; 405/216

See application file for complete search history.

(56) References Cited

U.S. PATENT DOCUMENTS

| | | | |
|---|---|---|---|
| 4,104,357 A | 8/1978 | Blair | |
| 4,183,883 A | 1/1980 | Blair | |
| 4,416,841 A | 11/1983 | Corea et al. | |
| 4,892,601 A * | 1/1990 | Norwood | 156/94 |
| 4,923,541 A * | 5/1990 | Burger | 156/87 |
| 5,294,151 A * | 3/1994 | Goode | 280/819 |
| 5,326,410 A * | 7/1994 | Boyles | 156/71 |
| 5,503,780 A | 4/1996 | Payne | |
| RE35,322 E * | 9/1996 | Owen et al. | 52/741.14 |
| 5,656,231 A * | 8/1997 | Blackmore | 264/408 |
| 5,705,200 A | 1/1998 | Payne | |
| 5,795,524 A * | 8/1998 | Basso et al. | 264/221 |
| 6,060,006 A | 5/2000 | Savenok | |
| 6,080,257 A | 6/2000 | Magoffin | |
| 6,102,611 A | 8/2000 | Roller | |
| 6,244,781 B1 | 6/2001 | Roller | |
| 6,500,375 B1 | 12/2002 | Aulick et al. | |
| 2001/0012473 A1 | 8/2001 | Roller | |
| 2002/0025221 A1 | 2/2002 | Johnson | |

* cited by examiner

*Primary Examiner*—Angela Ortiz
(74) *Attorney, Agent, or Firm*—Michael Best & Friedrich LLP

(57) ABSTRACT

A composite pole including a structural member and a cured resin layer adjacent the structural member and defining an exterior surface. The composite pole can be manufactured by providing a mold, inserting a structural member within the mold to define a space between the structural member and the mold, filling the space between the structural member and the mold with a liquid thermosetting resin, curing the liquid thermosetting resin to define an exterior surface, and removing the cured liquid thermosetting resin and structural member from the mold. The composite pole can also be manufactured by casting a jacket onto an installed pole by applying a mold around the installed pole, filling a space between the installed pole and the mold with a liquid thermosetting resin, curing the liquid thermosetting resin to define an exterior surface, and removing the mold from around the cured liquid thermosetting resin and the installed pole.

8 Claims, 2 Drawing Sheets

METHOD OF MANUFACTURING COMPOSITE UTILITY POLES

This application claims the benefit of prior filed co-pending provisional patent application No. 60/382,384 filed on May 22, 2002.

FIELD OF THE INVENTION

The invention relates to light and utility poles, and, more particularly, to utility poles made from composite materials.

BACKGROUND OF THE INVENTION

Light and utility poles have long been made of traditional materials such as wood, steel, cast iron, aluminum, and concrete. Each of these materials suffers from one or more disadvantages. For example, these traditional materials are heavy, expensive, electrically conductive, unattractive, and prone to corrosion. Light and utility poles made from electrically conductive materials are potential electric shock hazards. In addition, light and utility poles made from these traditional materials are difficult and expensive to install.

Period style poles serve the same function as the traditional poles, however, the period style poles are more decorative. A majority of factories and foundries that manufactured period style poles are no longer in existence. The tooling and original patterns have long been lost and many of the facilities closed due to environmental problems.

Recently, composite poles made from fiberglass and resin (polyester or epoxy) have become a widely accepted alternative to the traditional and period style poles. These composite materials are corrosion resistant, lightweight, inexpensive, attractive, and non-conductive. Further, light and utility poles made from composites can be directly buried into the ground because the composite material will not corrode or rot. These composite poles are typically made by a number of conventional processes such as filament winding, centrifugal casting, pultrusion, and resin transfer molding. The poles may be straight or tapered, and may have various outside surfaces such as flutes, textures, or smooth contours.

These methods of manufacturing composite poles are selected to provide the poles with certain desired characteristics. For example, the appearance of the outside surface is important, and great expenses are taken to achieve a high quality surface. In addition, the strength of the pole is important, as it must carry light fixtures, signs, traffic signals, and the like in high wind situations. A method that increases the strength and improves the decorative appearance of the pole without adding excess cost is thus commercially important.

One such method of producing a pole includes making a fiberglass pole by conventional means such as filament winding or centrifugal casting. In this method, a decorative mold such as a tapered fluted or octagonal shape is prepared by applying a gel coat of polyester resin to the inside of the mold. After the gel coat partially polymerizes, a polyester fiberglass skin is applied to the gel coat. The polyester fiberglass skin can be applied by hand lay-up means or through the use of a fiberglass chopper gun, which applies resin and chopped fiberglass together. In either of these processes, the fiberglass skin must be hand rolled out to compact the fiberglass and force it to conform to the mold detail. Compacting the fiberglass is labor intensive and expensive. After the fiberglass skin polymerizes, the fiberglass pole is centered in two mold halves, which are joined together and placed in an upright position. A mix of polymer concrete (polyester resin and aggregate) is then poured into the annular space between the fiberglass skin and the inside fiberglass pole. After polymerization is complete, the mold is opened and the completed pole removed. The completed pole is more rigid and stronger than the fiberglass "core pole," and has a decorative outside appearance such as a fluted or octagonal surface.

Another method of producing a decorative fluted pole includes placing layers of fiberglass cloth into a mold which may be gel coated as in the previous example. A mandrel such as a metal pole is treated with a mold release and inserted into the mold. Polyester resin is then forced into the space between the mandrel and the mold by either pressure, vacuum, or a combination of both, and allowed to polymerize. The mandrel is then withdrawn, and the pole removed from the mold. Because there is no fiberglass "core pole" with this method, these poles can be manufactured for a lower cost compared to the poles made by the first method described above, however, these poles are typically limited to lower stress situations.

A third method of producing a decorative composite pole includes loading fiberglass reinforcement (typically in a woven or knit form) into a metal tube, introducing polyester resin into the tube, and rapidly spinning the metal mold tube. This centrifugal force typically forces the fiberglass reinforcement into the flutes, however, it also tends to bridge between the flutes and cause weak areas in the pole. After polymerization is completed, the pole is withdrawn from the mold tube. In addition to the mentioned bridging, the excess resin goes to the inside of the pole, since it has a lower specific gravity than does the fiberglass. This unreinforced resin is brittle, and adds little to the strength of the pole. As can be appreciated to one skilled in the art, it becomes more difficult to manufacture a pole using this method when the pole is both tapered and fluted as opposed to manufacturing a pole that is round and straight.

The fourth method of producing a decorative composite pole consists of preparing a two-piece split decorative mold with a mold release and gel coat. Fiberglass mat wet out with polyester resin is applied to one mold half with excess laminate on the other side of the mold. A rubber bag or hose is placed on the wet laminate, the excess laminate folded over the bag, and the second mold half is installed and clamped into place. The bag is then inflated, forcing the wet laminate against the mold surface until the resin cures. The manufacturing process results in variable quality and relatively high costs.

In addition to new installations, there are huge numbers of existing poles installed which are corroding or could benefit from a more decorative appearance, but the cost of replacing them is extremely high, especially in urban locations. A method of retrofitting and protecting these existing poles in place would also be desirable and commercially important.

SUMMARY OF THE INVENTION

One embodiment of the present invention is directed to a method of manufacturing a composite pole including providing a mold, inserting a structural member within the mold to define a space between the structural member and the mold, filling the space between the structural member and the mold with a liquid thermosetting resin, curing the liquid thermosetting resin to define an exterior surface, and removing the cured liquid thermosetting resin and structural member from the mold.

Another embodiment of the invention is directed to a composite pole including a structural member, and a cured resin layer adjacent the structural member and defining an exterior surface.

Another method embodying the invention is directed to casting a jacket onto an installed pole. The method includes providing a mold, applying the mold around the installed pole to define a space between the installed pole and the mold, filling the space between the installed pole and the mold with a liquid thermosetting resin, curing the liquid thermosetting resin to define an exterior surface, and removing the mold from around the installed pole.

Other features and advantages of the invention will become apparent to those skilled in the art upon review of the following detailed description, claims, and drawings.

Figure 1:
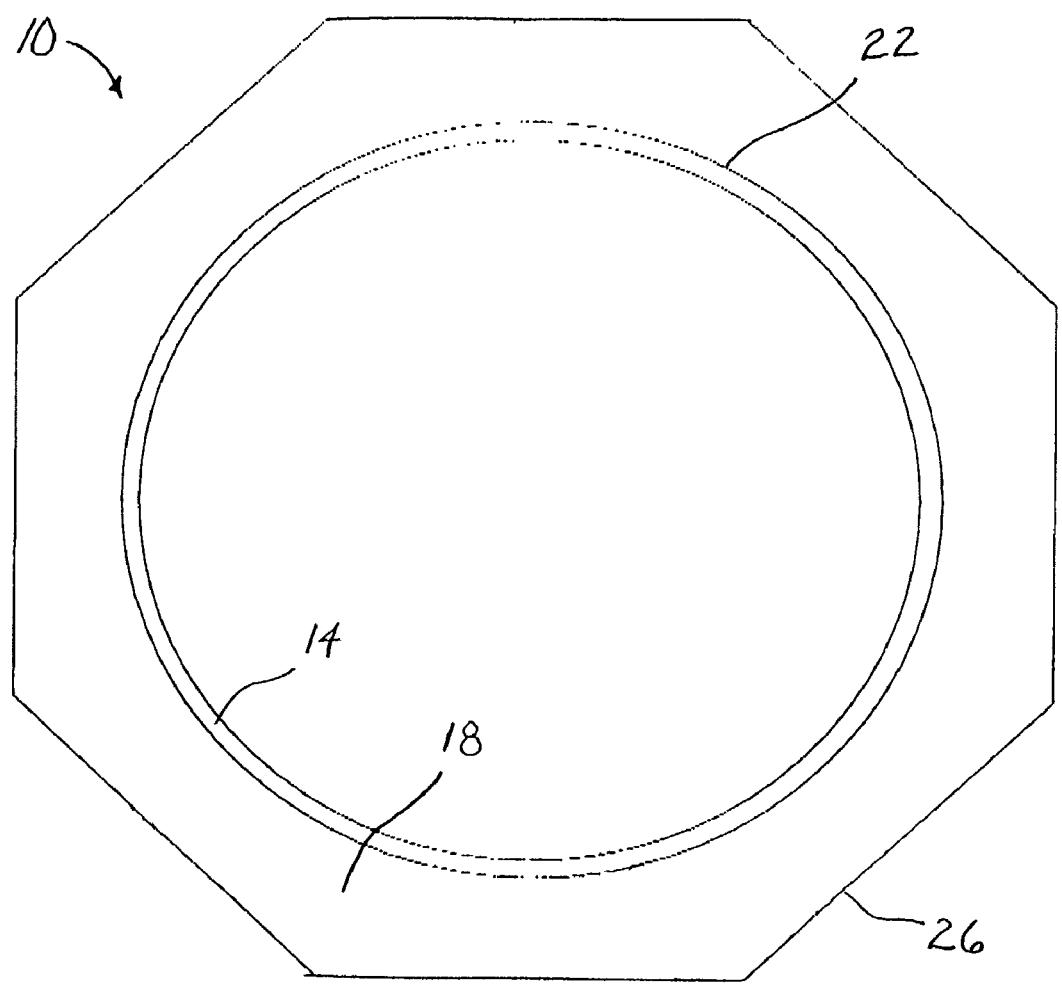
FIG. 1 is a cross-section view of a composite pole.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

FIG. 1 illustrates a cross-section of a composite pole 10 embodying the present invention. The composite pole includes a hollow fiberglass pole 14 and a urethane jacket 18 bonded to the exterior face 22 of the fiberglass pole 14. The urethane jacket 18 includes an outside face 26 that defines the exterior surface of the composite pole 10. The cross-section of the composite pole 10 is not limited to the illustrated embodiment, and can also be configured in other geometric shapes. Likewise, although not illustrated, the composite pole 10 can extend a length with a constant or tapered cross-section.

Figure 2:
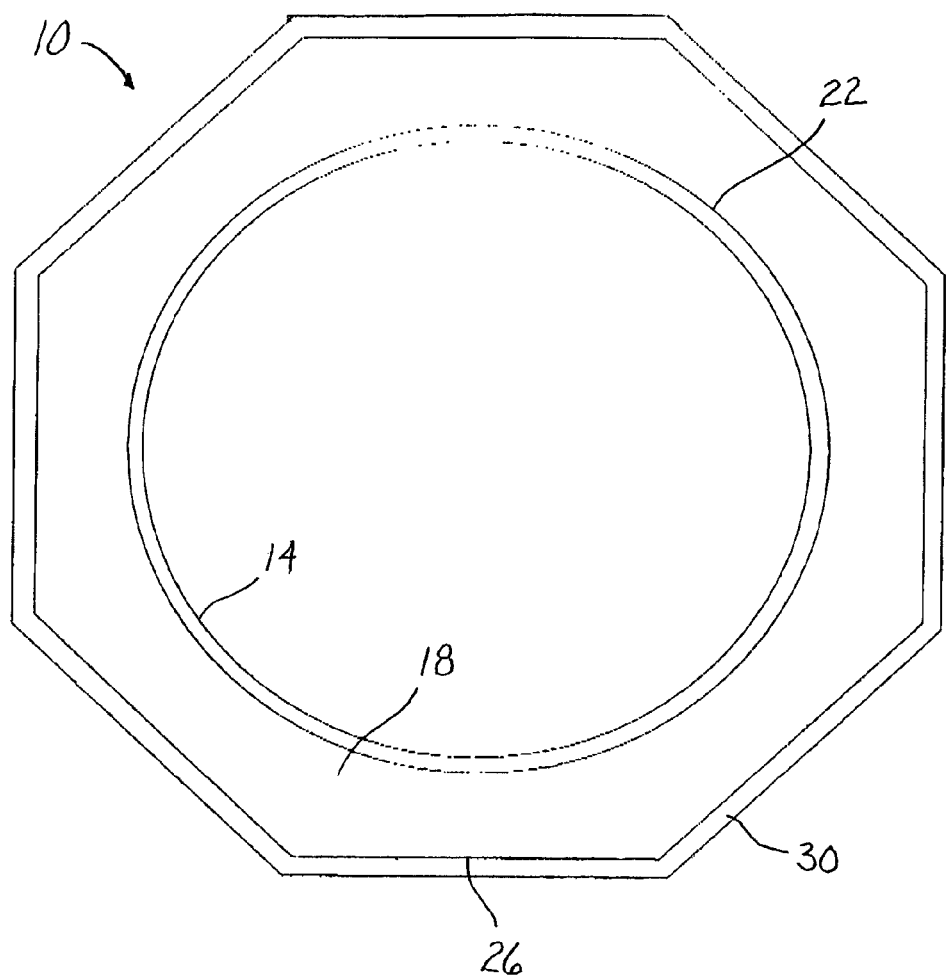
FIG. 2 is a view similar to the view shown in FIG. 2, illustrating the outer mold.

The method of manufacturing the composite pole is explained in greater detail below with reference to FIG. 2. A mold 30 having the desired pattern is prepared with a release agent to aid removal from the composite pole 10. The previously made fiberglass pole 14 made by conventional techniques is then centered in the mold 30 and a seal placed in one end. The mold 30 may be either a one-piece mold used to produce a tapered fluted shape, or a multi-piece mold used to produce a pole with a surface with features such as flowers and vines and the like. The mold 30 is placed in an upright position, and the annular space between the core pole and the bare mold is filled with a liquid thermosetting resin such as urethane, either solid or a high density foam. After the urethane polymerizes, the composite pole is removed from the mold and finished.

The urethane may be selected from a wide range of resins which have differing hardness, heat deflection temperatures, elastomeric properties, tensile properties, and the like. In addition, the urethane may be pigmented and/or have fillers added to reduce the cost or to improve the properties. For example, the urethane can also be modified for static reduction and electro-static finishing. Also, alumina trihydrate can be added to improve the fire resistance of the material. A urethane which is known to work well is 8240 from the T A Davies Company.

As can be appreciated, the thickness of the urethane jacket 18 may be controlled by the inside diameter of the mold 30 and the outside diameter of the fiberglass pole 14. Taper angles may also be controlled in the same manner.

In addition to a fiberglass core pole 14, other structural materials such as steel or aluminum may be used where cost or strength considerations warrant. For example, in high load situations, a heavy steel core may be used where it would not be cost effective to use a very thick fiberglass core. The use of a steel core would also limit the amount of deflection encountered in strong winds. In this case, the load carrying properties of the steel are used, but it is protected from external corrosion by the urethane jacket 18, which also provides a decorative appearance.

As an example of the improvement in ultimate strength of the bare fiberglass core pole 14, bending tests per ANSI C136.20 methods were conducted on both the bare fiberglass core pole and poles which had the urethane applied to the exterior. On the bare poles, failure occurred at about 450 ft-lbs. of load applied at the ground line of the pole, while the load to failure of the urethane strengthened pole is around 1000 ft-lbs.

An existing installed pole may be retrofitted by removing any items installed on the pole surface, applying a two-piece mold around the pole, plugging the bottom, and filling the annular space with urethane. After polymerization (typically 30 minutes or so), the molds are removed and signs, etc reinstalled. The pole is now protected from external corrosion, and may have a decorative appearance. Since the urethane may easily be pigmented, the color will go all through the urethane jacket, thus rendering damage to the jacket less visible than if the pole were only painted.

As an alternative to casting an entire urethane jacket 18 to an existing pole, it is also possible to cast only a shortened jacket onto a structural member. For example, a shortened jacket could be cast around only the lowest foot or so of the pole to protect the pole at the ground line from weed eaters or mowers (polyurethane is very abrasion resistant). Currently with known fiberglass poles, when the protective paint is chipped off the pole, it exposes the less-weather resistant resin to UV exposure. Since the color will go all the way through the urethane layer (approximately ½" thick) on the composite pole 10, any damage to the urethane jacket will be unnoticeable. Another use would be to cast a decorative medallion or detail anywhere on the pole, either at the factory or onto an installed pole, without making a casting over the entire pole.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method of manufacturing a composite pole comprising:

providing a mold with an inner surface substantially resembling a pole;

inserting a structural member centrally within the mold to define an annular cavity between the structural member and the inner surface;

filling the annular cavity between the structural member and the inner surface with a curable, thermosetting urethane resin;

adding pigmentation to the urethane resin;

adding a filler to the urethane resin to improve the electrostatic resistance of the cured urethane resin;

adding a filler to the urethane resin to improve the fire resistance of the cured urethane resin;

curing the urethane resin to define an exterior surface substantially resembling a pole and to bond the urethane resin to the structural member;

removing the cured urethane resin and structural member from the mold; and forming an exterior surface of the composite pole with the exterior surface of the cured thermosetting urethane resin.

2. The method of claim 1, wherein the exterior surface is fluted.

3. The method of claim 1, wherein the exterior surface is tapered.

4. The method of claim 1, wherein the urethane is solid urethane.

5. The method of claim 1, wherein the urethane is high density foam urethane.

6. The method of claim 1, wherein the structural member is a pole.

7. The method of claim 6, wherein the pole is a fiberglass pole.

8. The method of claim 6, wherein the pole is a metal pole.

* * * * *